(12) United States Patent
Hartnett et al.

(10) Patent No.: US 12,103,560 B2
(45) Date of Patent: Oct. 1, 2024

(54) METHODS AND SYSTEMS FOR PREDICTING ACTIONS OF AN OBJECT BY AN AUTONOMOUS VEHICLE TO DETERMINE FEASIBLE PATHS THROUGH A CONFLICTED AREA

(71) Applicant: Argo AI, LLC, Pittsburgh, PA (US)

(72) Inventors: Andrew T. Hartnett, West Hartford, CT (US); Constantin Savtchenko, Sewickley, PA (US); G. Peter K. Carr, Allison Park, PA (US)

(73) Assignee: Argo AI, LLC, Pittsburgh, PA (US)

( * ) Notice: Subject to any disclaimer, the term of this patent is extended or adjusted under 35 U.S.C. 154(b) by 210 days.

(21) Appl. No.: 17/060,837

(22) Filed: Oct. 1, 2020

(65) Prior Publication Data

US 2022/0105959 A1    Apr. 7, 2022

(51) Int. Cl.
*B60W 60/00* (2020.01)
*B60W 30/18* (2012.01)

(52) U.S. Cl.
CPC .. *B60W 60/0017* (2020.02); *B60W 30/18159* (2020.02); *B60W 60/0027* (2020.02); *B60W 2554/402* (2020.02); *B60W 2554/404* (2020.02)

(58) Field of Classification Search
CPC ....... B60W 60/0017; B60W 30/18159; B60W 60/0027; B60W 2554/402; B60W 2554/404; B60W 2555/60
See application file for complete search history.

(56) References Cited

U.S. PATENT DOCUMENTS

| | | |
|---|---|---|
| 6,510,388 B1 | 1/2003 | Sporrong et al. |
| 6,820,006 B2 | 11/2004 | Patera |
| 8,146,703 B2 | 4/2012 | Baumann et al. |

(Continued)

FOREIGN PATENT DOCUMENTS

| | | |
|---|---|---|
| CN | 109080629 A | 12/2018 |
| CN | 110462703 A | 11/2019 |

(Continued)

OTHER PUBLICATIONS

Wikipedia Article "Statistical classification" https://en.wikipedia.org/wiki/Statistical_classification,; last accessed Oct. 14, 2023, pp. 1-6 (Year: 2023).*

(Continued)

*Primary Examiner* — Aniss Chad
*Assistant Examiner* — Jennifer M Anda
(74) *Attorney, Agent, or Firm* — Fox Rothschild LLP

(57) ABSTRACT

Systems and methods for predicting actions of an actor before entering a conflicted area are disclosed. The methods may include detecting the presence of an actor in an environment of an autonomous vehicle while the autonomous vehicle and the actor are approaching the conflicted area, determining whether the autonomous vehicle has precedence over the actor for traversing the conflicted area, assigning a kinematic target to the moving object that requires the moving object to come to a stop at an yield point before entering the conflicted area if the autonomous vehicle has precedence over the actor, determining whether a plurality of forecasted trajectories for the actor need to be generated, and controlling movement of the autonomous vehicle to traverse the conflicted area accordingly.

28 Claims, 7 Drawing Sheets

(56) References Cited

U.S. PATENT DOCUMENTS

| | | | |
|---|---|---|---|
| 8,340,883 B2 | 12/2012 | Arbitmann et al. | |
| 8,755,998 B2 | 6/2014 | Braennstroem et al. | |
| 9,229,453 B1 | 1/2016 | Lee | |
| 9,248,834 B1 | 2/2016 | Ferguson et al. | |
| 9,495,874 B1 | 11/2016 | Zhu et al. | |
| 9,517,767 B1 | 12/2016 | Kentley et al. | |
| 9,555,781 B2 | 1/2017 | Breuer et al. | |
| 9,630,619 B1 | 4/2017 | Kentley et al. | |
| 9,669,827 B1* | 6/2017 | Ferguson | G05D 1/0088 |
| 9,824,589 B1* | 11/2017 | Ramirez | G08G 1/163 |
| 10,005,464 B2 | 6/2018 | Toyoda et al. | |
| 10,026,318 B2 | 7/2018 | Maeda et al. | |
| 10,037,694 B2 | 7/2018 | Lee | |
| 10,046,761 B2 | 8/2018 | Meyer et al. | |
| 10,360,800 B2 | 7/2019 | Bender et al. | |
| 10,496,091 B1 | 12/2019 | Ross et al. | |
| 10,509,413 B2 | 12/2019 | Mou | |
| 10,564,639 B1 | 2/2020 | Zhu et al. | |
| 10,745,003 B2 | 8/2020 | Kentley-Klay et al. | |
| 10,928,820 B1 | 2/2021 | Tao et al. | |
| 2003/0055563 A1 | 3/2003 | Jonas Lars et al. | |
| 2008/0084283 A1 | 4/2008 | Kalik | |
| 2011/0213513 A1 | 9/2011 | Naderhirn | |
| 2011/0246156 A1 | 10/2011 | Zecha et al. | |
| 2013/0253816 A1 | 9/2013 | Caminiti et al. | |
| 2016/0185347 A1* | 6/2016 | Lefevre | B60W 30/0953 701/301 |
| 2017/0039855 A1 | 2/2017 | Maeda et al. | |
| 2017/0057498 A1 | 3/2017 | Katoh | |
| 2017/0120803 A1 | 5/2017 | Kentley et al. | |
| 2017/0120902 A1 | 5/2017 | Kentley et al. | |
| 2017/0158193 A1* | 6/2017 | Lopez | B60W 30/18154 |
| 2017/0217431 A1 | 8/2017 | Class et al. | |
| 2017/0297568 A1 | 10/2017 | Kentley et al. | |
| 2017/0329332 A1 | 11/2017 | Pilarski et al. | |
| 2017/0336795 A1 | 11/2017 | Wei et al. | |
| 2018/0005050 A1 | 1/2018 | Browning et al. | |
| 2018/0099663 A1 | 4/2018 | Diedrich et al. | |
| 2018/0099665 A1* | 4/2018 | You | G01S 13/931 |
| 2018/0148052 A1 | 5/2018 | Suto et al. | |
| 2018/0233048 A1 | 8/2018 | Andersson et al. | |
| 2018/0257647 A1 | 9/2018 | Jurca et al. | |
| 2019/0025841 A1* | 1/2019 | Haynes | B60W 30/00 |
| 2019/0220021 A1 | 7/2019 | Yasui et al. | |
| 2019/0225150 A1 | 7/2019 | Nohl et al. | |
| 2019/0225212 A1* | 7/2019 | Buerkle | B60W 30/0956 |
| 2019/0243371 A1 | 8/2019 | Nister et al. | |
| 2019/0291726 A1* | 9/2019 | Shalev-Shwartz | B60W 10/20 |
| 2019/0291727 A1 | 9/2019 | Shalev-Shwartz et al. | |
| 2019/0310644 A1 | 10/2019 | Zhang | |
| 2019/0333373 A1 | 10/2019 | Fang et al. | |
| 2020/0026277 A1 | 1/2020 | Palanisamy et al. | |
| 2020/0079371 A1 | 3/2020 | Sakamoto et al. | |
| 2020/0086855 A1 | 3/2020 | Packer et al. | |
| 2020/0111366 A1* | 4/2020 | Nanri | B60W 30/10 |
| 2020/0124424 A1 | 4/2020 | Shibahata | |
| 2020/0201334 A1* | 6/2020 | Max | G08G 1/0129 |
| 2020/0262418 A1 | 8/2020 | Lin | |
| 2020/0276988 A1* | 9/2020 | Graves | B60W 60/0011 |
| 2020/0331470 A1* | 10/2020 | Nanri | G08G 1/167 |
| 2021/0031760 A1 | 2/2021 | Ostafew et al. | |
| 2021/0035447 A1 | 2/2021 | Urano et al. | |
| 2021/0107476 A1* | 4/2021 | Cui | B60W 60/00276 |
| 2021/0114589 A1 | 4/2021 | Komuro et al. | |
| 2021/0157315 A1* | 5/2021 | Wray | G06N 7/01 |
| 2021/0181749 A1 | 6/2021 | Pan et al. | |
| 2021/0389133 A1 | 12/2021 | Brizzi et al. | |
| 2022/0105928 A1 | 4/2022 | Foil et al. | |

FOREIGN PATENT DOCUMENTS

| | | | | |
|---|---|---|---|---|
| DE | 102013001228 A1 | 7/2014 | | |
| DE | 102013001229 A1 | 7/2014 | | |
| DE | 102018131453 A1 | 12/2018 | | |
| EP | 3410419 A1 | 12/2018 | | |
| EP | 3552921 A1 | 10/2019 | | |
| JP | 2002-236994 A | 8/2002 | | |
| JP | 2004301667 A | 10/2004 | | |
| JP | 20100228740 A | 10/2010 | | |
| JP | 2016122308 A | 7/2016 | | |
| KR | 10-2018-0040014 A | 4/2018 | | |
| KR | 20180104496 A | 9/2018 | | |
| WO | WO-2014053735 A2 * | 4/2014 | | B60W 30/09 |
| WO | 2016094088 A1 | 6/2016 | | |
| WO | 2017108263 A1 | 6/2017 | | |

OTHER PUBLICATIONS

WO-2014053735-A2 machine translation (Year: 2024).*

Horst, John et al., "Trajectory Generation for an On-Road Autonomous Vehicle," The National Institute of Standards and Technolgoy, pp. 1-9, Sep. 2005.

Information about Related Patents and Patent Applications, see section 6 of the accompanying Information Disclosure Statement Letter, which concerns Related Patents and Patent Applications.

U.S. Appl. No. 16/547,712, filed Aug. 22, 2019, Systems and Methods for Trajectory Based Safekeeping of Vehicles.

U.S. Appl. No. 16/547,718, filed Aug. 22, 2019, Systems and Methods for Trajectory Based Safekeeping of Vehicles.

U.S. Appl. No. 17/352,823, filed Jun. 1, 2021, Systems and Methods for Trajectory Based Safekeeping of Vehicles.

U.S. Appl. No. 17/060,817, filed Oct. 1, 2020, Methods and Systems for Performing Outlet Inference by an Autonomous Vehicle to Determine Feasible Paths Through an Intersection.

U.S. Appl. No. 17/207,889, filed Mar. 22, 2021, Methods and Systems for Autonomous Vehicle Inference of Routes for Actors Exhibiting Unrecognized Behavior.

U.S. Appl. No. 17/060,928, filed Oct. 1, 2020, Systems and Methods for Imminent Collision Avoidance.

U.S. Appl. No. 17/352,823, filed Jun. 21, 2021, Systems and Methods for Trajectory Based Safekeeping of Vehicles.

European search report for EP 21876222.7 dated Aug. 7, 2024, 7 pages.

* cited by examiner

METHODS AND SYSTEMS FOR PREDICTING ACTIONS OF AN OBJECT BY AN AUTONOMOUS VEHICLE TO DETERMINE FEASIBLE PATHS THROUGH A CONFLICTED AREA

BACKGROUND

Automated driving systems are designed to operate a vehicle on the road without driver interaction or other external control, for example, self-driving vehicles or autonomous vehicles. An autonomous vehicle is thus configured to traverse a planned path between its current position and a target future position without input from the driver. To traverse the planned path, the autonomous vehicle must account for behavior of objects within the environment, such as neighboring vehicles, pedestrians, or obstacles, and safely execute maneuvers taking the presence of such objects into account. This is especially true for driving decisions at yield scenarios, that is, where the autonomous vehicle must determine whether to proceed into a conflicted space (e.g., an intersection) with caution to avoid neighboring vehicles or to stop and wait, i.e. yield, until any neighboring vehicles have cleared the intersection.

Existing automated driving systems in autonomous vehicles account for current behavior of objects such as neighboring vehicles by measuring a time to contact between vehicles to identify windows of opportunity for the autonomous vehicle to continue along its planned path. However, to improve safety and efficiency, a driving system in an autonomous vehicle will need to account for interactions between various objects within the environment and more accurately predict future behavior of these objects. This is particularly important when negotiating right-of-way between vehicles for traversing a conflicted space, such as when an agreement is required about who has a right of way over a conflicted space (e.g., a traffic light that both an object and the autonomous vehicle need to traverse). Agreements regarding right of way can be broken and the autonomous vehicle must be able to detect such disagreements early in order to safely navigate the conflicted space.

SUMMARY

In one or more scenarios, systems and methods for predicting actions of an actor before entering a conflicted area are disclosed. In various implementations, the systems for executing various methods of this disclosure may include an autonomous vehicle including one or more sensors, a processor, and a non-transitory computer-readable medium including one or more instructions to be executed by the processor. The methods may include detecting presence of an actor in an environment of an autonomous vehicle while the autonomous vehicle and the actor are approaching the conflicted area (for example, using data collected by the sensors of the autonomous vehicle. The methods may further include determining whether the autonomous vehicle has precedence over the actor for traversing the conflicted area, assigning a kinematic target to the actor that requires the actor to come to a stop at an yield point before entering the conflicted area if the autonomous vehicle has precedence over the actor for traversing the conflicted area, determining whether a plurality of forecasted trajectories for the actor need to be generated, and controlling movement of the autonomous vehicle to traverse the conflicted area based on the determination whether the plurality of forecasted trajectories for the actor need to be generated.

In certain of such scenarios, determining whether a plurality of forecasted trajectories for the actor need to be generated may include determining that is possible that the actor may not achieve the kinematic target. Such possibility may be determined by forecasting a first state of the actor as it travels towards the yield point (e.g., using a motion model), determining a required braking power to bring the actor to a stop before the yield point when applied at a second state (using the first state), and determining whether the actor can accomplish the required braking power. Optionally, the motion model may be used to predict a motion of the actor over a prediction horizon as it travels towards the yield point. The prediction horizon may include a plurality of time-steps such that the first state is the state of the actor at a first one of plurality of time-steps, and the second state is the state of the actor at a second one of the plurality of time-steps that occurs sequentially after the first time-step. If there is no need to determine multiple trajectories for the actor, the method may include repeating the step of determining whether a plurality of forecasted trajectories for the actor need to be generated for multiple time steps in the prediction horizon. In certain implementations, whether the vehicle actor can accomplish the required braking power may be determined by comparing the required braking power to a maximum allowed braking power corresponding to the actor. Optionally, the methods may also include identifying the maximum allowed braking power corresponding to the actor by, for example, classifying the actor into one of a plurality of actor classes, and using a maximum allowed braking power associated with that one of the plurality of actor classes as the maximum allowed braking power corresponding to the actor. Additionally and/or alternatively, the methods may also include controlling movement of the autonomous vehicle to yield to the actor before traversing the conflicted area if the actor cannot accomplish the required braking power.

In certain scenarios, the methods may also include forecasting a first state of the actor as it travels towards the yield point, using a motion model, using the first state determining a required braking power to bring the actor to a stop before the yield point when applied at a second state, =and determining a first probability and a second probability if there is a need to generate a plurality of forecasted trajectories for the actor. The first probability is associated with a first set of forecasts that include the actor coming to a stop at the yield point, and the second probability is associated with a second set of forecasts that comprise the actor coming to a stop at the yield point. The first and second probabilities may be determined based on the required braking power. For example, the first and second probabilities may be determined based on the required braking power using a classifier trained to determine the first probability and the second probability. Optionally, the methods may also include controlling movement of the autonomous vehicle to traverse the conflicted area based on the first probability and the second probability. In some implementations, the methods may also include determining whether the vehicle actor can accomplish the required braking power by comparing the required braking power to a maximum allowed braking power corresponding to the actor, and controlling movement of the autonomous vehicle to yield to the actor before traversing the conflicted area if the actor cannot accomplish the required braking power.

In various scenarios, the methods may also include identifying an expected corridor of travel for the autonomous vehicle, identifying an expected corridor of travel for the actor, and determining whether the autonomous vehicle has precedence over the actor for traversing the conflicted area only if the expected corridor of travel for the autonomous vehicle and the expected corridor of travel for the actor intersect in the conflicted area. Optionally, the systems may also identify the yield point in the expected corridor of travel for the actor.

In methods, in certain scenarios, may also include, controlling movement of the autonomous vehicle to stop at a second yield point in the expected corridor of travel for the autonomous vehicle before traversing the conflicted area if the autonomous vehicle has precedence over the actor for traversing the conflicted area.

DETAILED DESCRIPTION

Figure 1:
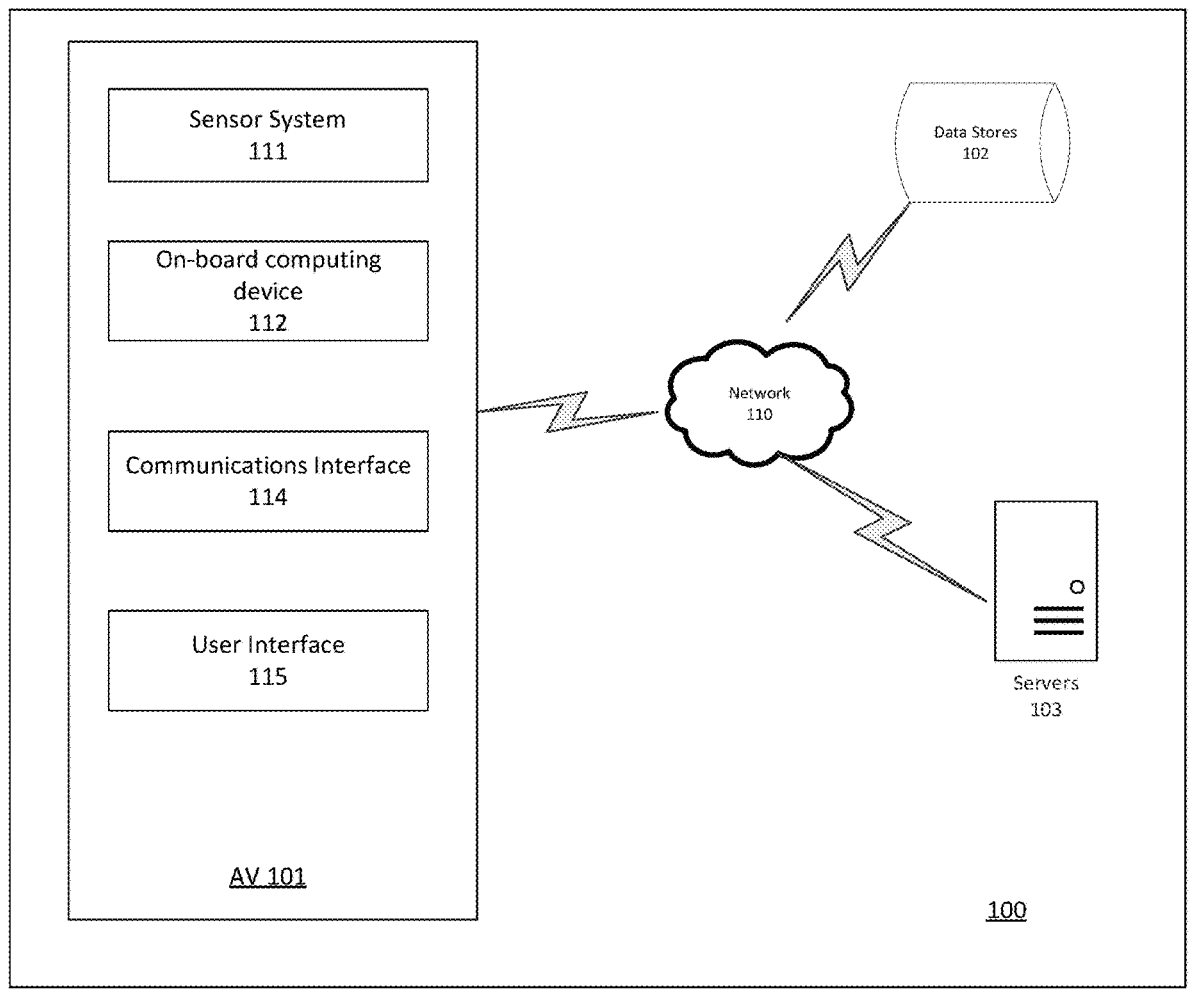
FIG. 1 is a block diagram illustrating an example autonomous vehicle system.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

Real-time prediction of actions by objects in the environment of an autonomous vehicle is a challenge for automated driving systems. Such real-time prediction is particularly challenging when such objects (e.g., other vehicles and/or pedestrians) break traffic rules. Systematically assuming the worst case action from the objects will paralyze the autonomous vehicle, but erroneously optimistic predictions can result in unsafe autonomous vehicle behavior.

This document describes methods and systems that are directed to addressing the problems described above, and/or other issues. Accordingly, the present solution concerns systems and methods for controlling vehicles. The methods involve: generating a vehicle trajectory for the vehicle that is in motion; detecting an object within a given distance from the vehicle; generating at least one possible object trajectory for the object which was detected; using the vehicle trajectory and at least one possible object trajectory to determine whether the object will yield to the autonomous vehicle by identifying a kinematic target for the vehicle; and determining the feasibility of the object attaining the kinematic target. The method also includes determining respective probabilities of a yielding forecast and a non-yielding forecast. The vehicle trajectory is modified when (i) it is determined that it is not feasible for the object to attain the kinematic target and/or (ii) based on the probabilities of the yielding forecast and the non-yielding forecast.

The present solution has many novel features. For example, unlike some conventional solutions that have a singular system for forecasting an object's possible path through an environment and a motion model of how they follow that path, the current system is a modular system where path generation, yielding determination, and motion modeling are treated as independent aspects. As such, complex right of way determinations can be treated separately and hidden from motion models used for predicting or forecasting the state (e.g., location, velocity, etc.) of objects in future time frames. The motion models simply follow prescribed kinematic targets.

Additionally, while conventional systems attempted to determine which forecast is best to return the most likely forecast while discarding the other forecasts, the systems and methods of this disclosure return a multimodal set of forecasts with their corresponding likelihoods. This is possible because unlike existing systems that attempt to make a likelihood determination per forecast, likelihood determination in the current system can be delayed until the system has seen all likely possibilities such that it can output multiple forecasts and determines likelihood given all options. The autonomous system can then train on the resulting states using the feasibility checks to improve its determinations about future object states. This ability to output multiple forecasts and their respective likelihoods is key to enable the autonomous vehicle to be aware of upcoming object actions much earlier.

FIG. 1 is a block diagram illustrating an example system 100 that includes an autonomous vehicle 101 in communication with one or more data stores 102 and/or one or more servers 103 via a network 110. Although there is one autonomous vehicle shown, multiple autonomous vehicles may be coupled to each other and/or coupled to data stores 102 and/or servers 103 over network 110. Network 110 may be any type of network such as a local area network (LAN), a wide area network (WAN) such as the Internet, a cellular network, a satellite network, or a combination thereof, and may be wired or wireless. Data store(s) 102 may be any kind of data stores such as, without limitation, map data store(s), traffic information data store(s), user information data store(s), point of interest data store(s), or any other type of content data store(s). Server(s) 103 may be any kind of servers or a cluster of servers, such as, without limitation, Web or cloud servers, application servers, backend servers, or a combination thereof.

As illustrated in FIG. 1, the autonomous vehicle 101 may include a sensor system 111, an on-board computing device 112, a communications interface 114, and a user interface 115. Autonomous vehicle 101 may further include certain components (as illustrated, for example, in FIG. 2) included in vehicles, such as, an engine, wheels, steering wheel, transmission, etc., which may be controlled by the on-board computing device 112 using a variety of communication signals and/or commands, such as, for example, acceleration signals or commands, deceleration signals or commands, steering signals or commands, braking signals or commands, etc.

The sensor system 111 may include one or more sensors that are coupled to and/or are included within the autonomous vehicle 101. Examples of such sensors include, without limitation, a radio detection and ranging (RADAR) system, a laser detection and ranging (LiDAR) system, a sound navigation and ranging (SONAR) system, one or more cameras (e.g., visible spectrum cameras, infrared cameras, etc.), temperature sensors, position sensors (e.g., global positioning system (GPS), etc.), location sensors, fuel sensors, motion sensors (e.g., inertial measurement units (IMU), etc.), humidity sensors, occupancy sensors, or the like. The sensor data can include information that describes the location of objects within the surrounding environment of the autonomous vehicle 101, information about the environment itself, information about the motion of the autonomous vehicle 101, information about a route of the autonomous vehicle, or the like. As autonomous vehicle 101 travels over a surface, at least some of the sensors may collect data pertaining to the surface.

The LiDAR system may include a sensor configured to sense or detect objects in an environment in which the autonomous vehicle 101 is located. Generally, LiDAR system is a device that incorporates optical remote sensing technology that can measure distance to a target and/or other properties of a target (e.g., a ground surface) by illuminating the target with light. As an example, the LiDAR system may include a laser source and/or laser scanner configured to emit laser pulses and a detector configured to receive reflections of the laser pulses. For example, the LiDAR system may include a laser range finder reflected by a rotating mirror, and the laser is scanned around a scene being digitized, in one, two, or more dimensions, gathering distance measurements at specified angle intervals.

Figure 2:
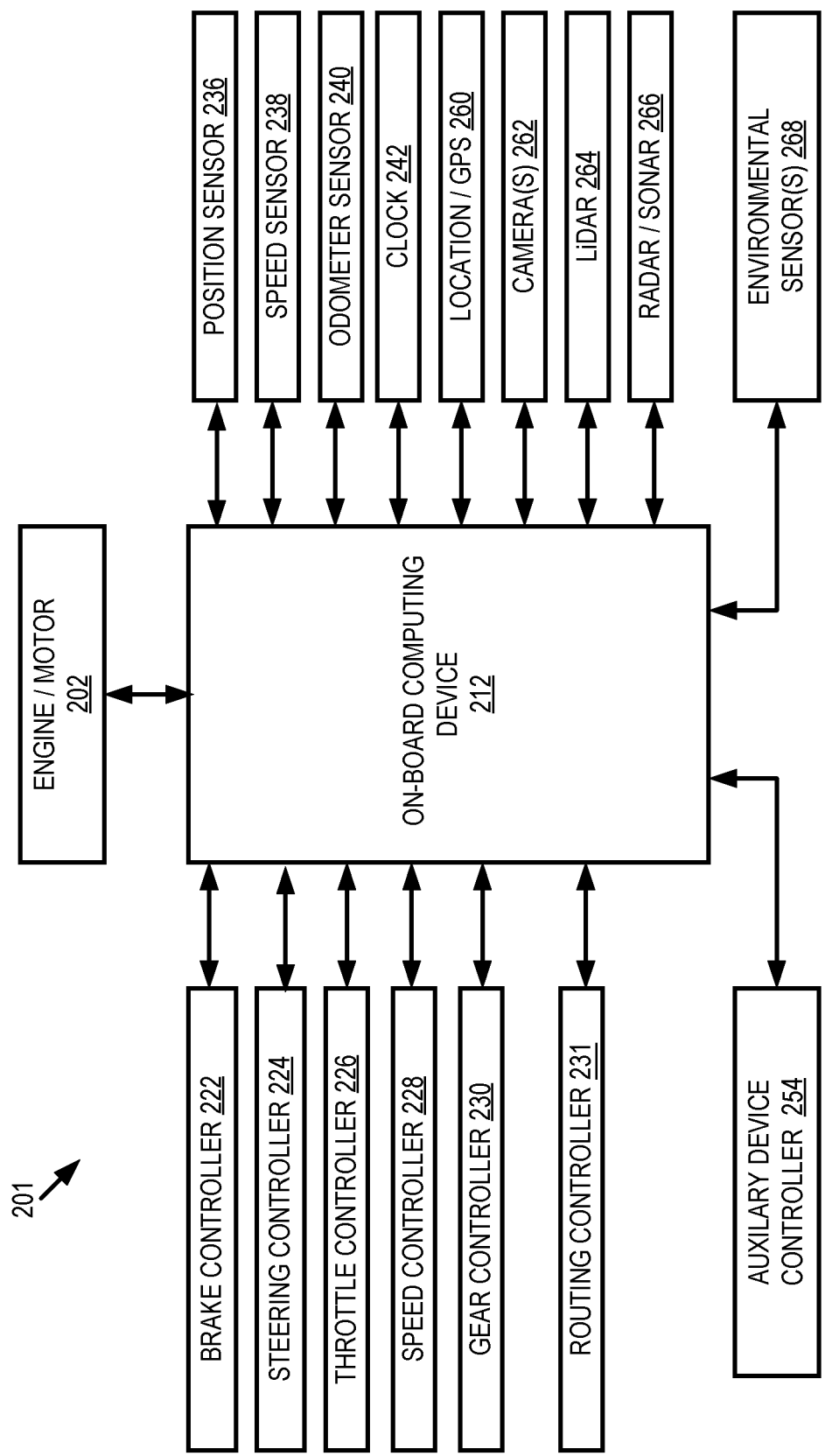
FIG. 2 illustrates an example vehicle controller system.

FIG. 2 illustrates an example system architecture for a vehicle 201, such as the autonomous vehicle 101 of FIG. 1 autonomous vehicle. The vehicle 201 may include an engine or motor 202 and various sensors for measuring various parameters of the vehicle and/or its environment. Operational parameter sensors that are common to both types of vehicles include, for example: a position sensor 236 such as an accelerometer, gyroscope and/or inertial measurement unit; a speed sensor 238; and an odometer sensor 240. The vehicle 101 also may have a clock 242 that the system architecture uses to determine vehicle time during operation. The clock 242 may be encoded into the vehicle on-board computing device 212, it may be a separate device, or multiple clocks may be available.

The vehicle 201 also may include various sensors that operate to gather information about the environment in which the vehicle is traveling. These sensors may include, for example: a location sensor 260 such as a GPS device; object detection sensors such as one or more cameras 262; a LiDAR sensor system 264; and/or a radar and or and/or a sonar system 266. The sensors also may include environmental sensors 268 such as a precipitation sensor and/or ambient temperature sensor. The object detection sensors may enable the vehicle 201 to detect objects that are within a given distance or range of the vehicle 201 in any direction, while the environmental sensors collect data about environmental conditions within the vehicle's area of travel. The system architecture will also include one or more cameras 262 for capturing images of the environment.

During operations, information is communicated from the sensors to an on-board computing device 212. The on-board computing device 212 analyzes the data captured by the sensors and optionally controls operations of the vehicle based on results of the analysis. For example, the on-board computing device 212 may control braking via a brake controller 222; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers such as an auxiliary device controller 254.

Geographic location information may be communicated from the location sensor 260 to the on-board computing device 212, which may then access a map of the environment that corresponds to the location information to determine known fixed features of the environment such as streets, buildings, stop signs and/or stop/go signals. Captured images from the cameras 262 and/or object detection information captured from sensors such as a LiDAR system 264 is communicated from those sensors) to the on-board computing device 212. The object detection information and/or captured images may be processed by the on-board computing device 212 to detect objects in proximity to the vehicle 201. In addition or alternatively, the vehicle 201 may transmit any of the data to a remote server system 103 (FIG. 1) for processing. Any known or to be known technique for making an object detection based on sensor data and/or captured images can be used in the embodiments disclosed in this document.

The on-board computing device 212 may obtain, retrieve, and/or create map data that provides detailed information about the surrounding environment of the autonomous vehicle 201. The on-board computing device 212 may also determine the location, orientation, pose, etc. of the AV in the environment (localization) based on, for example, three dimensional position data (e.g., data from a GPS), three dimensional orientation data, predicted locations, or the like. For example, the on-board computing device 212 may receive GPS data to determine the AV's latitude, longitude and/or altitude position. Other location sensors or systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location. The map data can provide information regarding: the identity and location of different roadways, road segments, lane segments, buildings, or other items; the location, boundaries, and directions of traffic lanes (e.g., the location and direction of a parking lane, a turning lane, a bicycle lane, or other lanes within a particular roadway) and metadata associated with traffic lanes; traffic control data (e.g., the location and instructions of signage, traffic lights, or other traffic control devices); and/or any other map data that provides information that assists the on-board computing device 212 in analyzing the surrounding environment of the autonomous vehicle 201.

The map data may also include information and/or rules for determining right of way of objects and/or vehicles in conflicted areas or spaces. A conflicted space (or conflicted area) refers to an area where more than one object and/or vehicle may be predicted to be present at the same time leading to a risk collision, unless one of the objects and/or vehicles is given precedence (i.e., right of way) to traverse the conflicted space. Examples of such conflicted spaces can include traffic light intersections, stop sign intersections, roundabouts, turns, crosswalks, pedestrian crossings etc. The right of way information and/or rules for a conflicted space may be derived from traffic laws and rules associated with a geographical area (and may not be the same for all spaces). For example, for a traffic light intersection, a vehicle that has a green light signal will have right of way over a vehicle that has a red light signal, a vehicle going straight will have right of way over a vehicle trying to turn left or right, a pedestrian will have right of way when there is a walk sign signal, etc. Similarly, a moving vehicle will have right of way over a stopped vehicle trying to merge into traffic and/or a vehicle moving in its lane will have right of way over a vehicle merging into another lane. In another example, a pedestrian will have right of way in a pedestrian crossing. At a stop sign, a vehicle that arrived at the stop sign first will have right of way over a vehicle that arrived at the stop sign later.

In certain embodiments, the map data may also include reference path information that correspond to common patterns of vehicle travel along one or more lanes such that the motion of the object is constrained to the reference path (e.g., locations within traffic lanes on which an object commonly travels). Such reference paths may be pre-defined such as the centerline of the traffic lanes. Optionally, the reference path may be generated based on a historical observations of vehicles or other objects over a period of time (e.g., reference paths for straight line travel, lane merge, a turn, or the like).

In certain embodiments, the on-board computing device 212 may also include and/or may receive information relating to the trip or route of a user, real-time traffic information on the route, or the like.

The on-board computing device 212 may include and/or may be in communication with a routing controller 231 that generates a navigation route from a start position to a destination position for an autonomous vehicle. The routing controller 231 may access a map data store to identify possible routes and road segments that a vehicle can travel on to get from the start position to the destination position. The routing controller 231 may score the possible routes and identify a preferred route to reach the destination. For example, the routing controller 231 may generate a navigation route that minimizes Euclidean distance traveled or other cost function during the route, and may further access the traffic information and/or estimates that can affect an amount of time it will take to travel on a particular route. Depending on implementation, the routing controller 231 may generate one or more routes using various routing methods, such as Dijkstra's algorithm, Bellman-Ford algorithm, or other algorithms. The routing controller 231 may also use the traffic information to generate a navigation route that reflects expected conditions of the route (e.g., current day of the week or current time of day, etc.), such that a route generated for travel during rush-hour may differ from a route generated for travel late at night. The routing controller 231 may also generate more than one navigation route to a destination and send more than one of these navigation routes to a user for selection by the user from among various possible routes.

In various implementations, an on-board computing device 212 may determine perception information of the surrounding environment of the autonomous vehicle 201. Based on the sensor data provided by one or more sensors and location information that is obtained, the on-board computing device 212 may determine perception information of the surrounding environment of the autonomous vehicle 201. The perception information may represent what an ordinary driver would perceive in the surrounding environment of a vehicle. The perception data may include information relating to one or more objects in the environment of the autonomous vehicle 201. For example, the on-board computing device 212 may process sensor data (e.g., LiDAR or RADAR data, camera images, etc.) in order to identify objects and/or features in the environment of autonomous vehicle 201. The objects may include traffic signals, road way boundaries, other vehicles, pedestrians, and/or obstacles, etc. The on-board computing device 212 may use any now or hereafter known object recognition algorithms, video tracking algorithms, and computer vision algorithms (e.g., track objects frame-to-frame iteratively over a number of time periods) to determine the perception.

In some embodiments, the on-board computing device 212 may also determine, for one or more identified objects in the environment, the current state of the object. The state information may include, without limitation, for each object: current location; current speed and/or acceleration, current heading; current pose; current shape, size, or footprint; type (e.g., vehicle vs. pedestrian vs. bicycle vs. static object or obstacle); and/or other state information.

The on-board computing device 212 may perform one or more prediction and/or forecasting operations. For example, the on-board computing device 212 may predict future locations, trajectories, and/or actions of one or more objects. For example, the on-board computing device 212 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, the autonomous vehicle 201, the surrounding environment, and/or their relationship(s). For example, if an object is a vehicle and the current driving environment includes an intersection, the on-board computing device 212 may predict whether the object will likely move straight forward or make a turn. If the perception data indicates that the intersection has no traffic light, the on-board computing device 212 may also predict whether the vehicle may have to fully stop prior to enter the intersection.

As discussed below in more detail, the on-board computing device 212 may also forecast a plurality of object trajectories through a conflicted space, and determine likelihoods associated with each such forecast.

In various embodiments, the on-board computing device 212 may determine a motion plan for the autonomous vehicle. For example, the on-board computing device 212 may determine a motion plan for the autonomous vehicle based on the perception data and/or the prediction data. Specifically, given predictions about the future locations of proximate objects and other perception data, the on-board computing device 212 can determine a motion plan for the autonomous vehicle 201 that best navigates the autonomous vehicle relative to the objects at their future locations.

In one or more embodiments, the on-board computing device 212 may receive predictions and make a decision regarding how to handle objects in the environment of the autonomous vehicle 201. For example, for a particular object (e.g., a vehicle with a given speed, direction, turning angle, etc.), the on-board computing device 212 decides whether to overtake, yield, stop, and/or pass based on, for example, traffic conditions, map data, state of the autonomous vehicle, etc. Furthermore, the on-board computing device 212 also plans a path for the autonomous vehicle 201 to travel on a given route, as well as driving parameters (e.g., distance, speed, and/or turning angle). That is, for a given object, the on-board computing device 212 decides what to do with the object and determines how to do it. For example, for a given object, the on-board computing device 212 may decide to pass the object and may determine whether to pass on the left side or right side of the object (including motion parameters such as speed). The on-board computing device 212 may also assess the risk of a collision between a detected object and the autonomous vehicle 201. If the risk exceeds an acceptable threshold, it may determine whether the collision can be avoided if the autonomous vehicle follows a defined vehicle trajectory and/or implements one or more dynamically generated emergency maneuvers is performed in a pre-defined time period (e.g., N milliseconds). If the collision can be avoided, then the on-board computing device 212 may execute one or more control instructions to perform a cautious maneuver (e.g., mildly slow down, accelerate, change lane, or swerve). In contrast, if the collision cannot be avoided, then the on-board computing device 112 may execute one or more control instructions for execution of an emergency maneuver (e.g., brake and/or change direction of travel).

For example, if the on-board computing device 212 determines that based on the object trajectory forecasts, an object is likely to break a right of way agreement with the autonomous vehicle, the on-board computing device 212 may determine a motion plan for the autonomous vehicle that avoids collision with such an object in a conflicted space.

As discussed above, planning and control data regarding the movement of the autonomous vehicle is generated for execution. The on-board computing device 212 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

In the various embodiments discussed in this document, the description may state that the vehicle or a controller included in the vehicle (e.g., in an on-board computing system) may implement programming instructions that cause the vehicle and/or a controller to make decisions and use the decisions to control operations of the vehicle. However, the embodiments are not limited to this arrangement, as in various embodiments the analysis, decision making and or operational control may be handled in full or in part by other computing devices that are in electronic communication with the vehicle's on-board computing device and/or vehicle control system. Examples of such other computing devices include an electronic device (such as a smartphone) associated with a person who is riding in the vehicle, as well as a remote server that is in electronic communication with the vehicle via a wireless communication network. The processor of any such device may perform the operations that will be discussed below.

Referring back to FIG. 1, the communications interface 114 may be configured to allow communication between autonomous vehicle 101 and external systems, such as, for example, external devices, sensors, other vehicles, servers, data stores, databases etc. Communications interface 114 may utilize any now or hereafter known protocols, protection schemes, encodings, formats, packaging, etc. such as, without limitation, Wi-Fi, an infrared link, Bluetooth, etc. User interface system 115 may be part of peripheral devices implemented within vehicle 101 including, for example, a keyboard, a touch screen display device, a microphone, and a speaker, etc.

Figure 3:
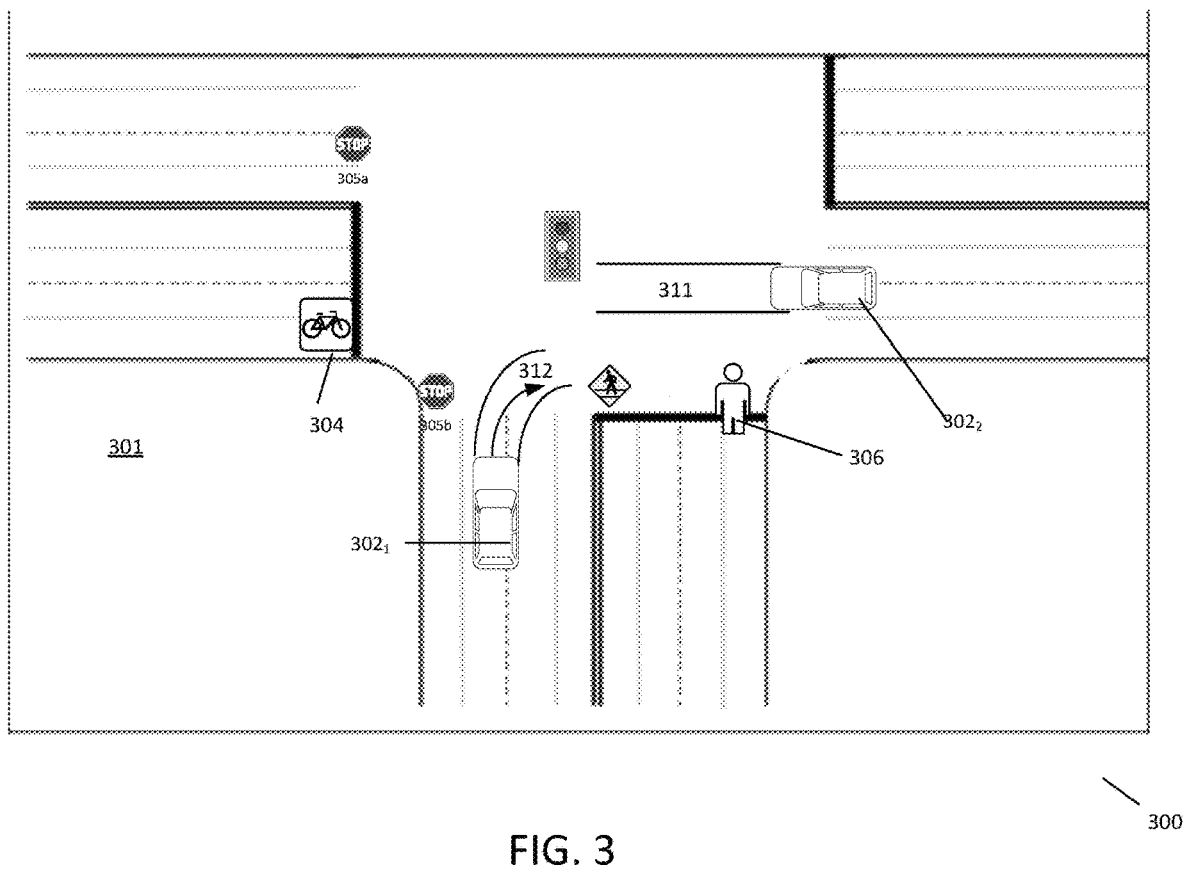
FIG. 3 illustrates an example environment in which an autonomous vehicle may travel.

Referring now to FIG. 3, there is provided an illustration of an example environment 300 in which an autonomous vehicle may travel. Environment 300 comprises a non-limiting example of a T-shaped intersection 301 that an autonomous vehicle $302_1$ that is traveling along a road in a semi-autonomous or autonomous manner is required to navigate. The autonomous vehicle $302_1$ is generally configured to detect objects $302_2$, 304, 306 in proximity thereto, and that are also navigating the intersection 301 around the same time as the autonomous vehicle $302_1$. The objects can include, but are not limited to, a vehicle $302_2$, cyclist 304 (such as a rider of a bicycle, electric scooter, motorcycle, or the like) and/or a pedestrian 306. The autonomous vehicle $302_1$ can also be configured to detect preliminary information for the intersection 301. The preliminary information can include map-based information such as the type of intersection 301 and the configuration of the intersection 301. For example, the map-based information can include the position of exits and entrances to the intersection 301, the lane structure of the intersection 301, the presence of, position of, and status of traffic signs, such as STOP signs 305a and 305b, associated with the intersection 301, the position of fixed objects in the intersection 301, etc. The preliminary information can also include traffic density information for the intersection 301. Traffic density information can indicate a general congestion level for the intersection 301 without identifying individual vehicles present at the intersection 301. This preliminary information can be accessed by the automated driving system from a remote location, for example, from a remote map database.

The autonomous vehicle $302_1$ can also be configured to identify a yield scenario at the intersection 301 based on the preliminary information. In this example, the yield scenario can be identified based on the presence of an yield sign or a STOP sign along the planned path for the autonomous vehicle $302_1$ and/or a detected object. Other example yield scenarios can be identified based on the presence of a red traffic light, a roundabout, and a lane merge situation. The identification of the yield scenario can be based both on the position of the autonomous vehicle $302_1$ and/or a detected object with respect to the intersection 301 and the preliminary information identified for the intersection 301. In another example, a yield scenario may be detected if both the travel-paths (i.e., corridors 311 and 312, respectively) of vehicle $302_1$ and vehicle $302_2$ interfere with each other. That is, the configuration of the intersection 301 is such that the vehicle $302_1$ and vehicle $302_2$ cannot proceed into the intersection 301 simultaneously without colliding with each other. The term "corridor" refers to a region of space through which the autonomous vehicle intends to travel, where the region of space, except in the direction of travel, has small margins around a polygon representative of the autonomous vehicle. In the direction of travel, the region of space includes the autonomous vehicle's travel path for a threshold period of time (e.g., corridors 311 and 312). Specifically, the entire volume of the autonomous vehicle is expected to remain within the corridor as it travels along the corridor. The corridor of travel may be determined based on the automated vehicle trajectory for traversing an area. For example, the corridor for an autonomous vehicle may be determined using perception, prediction, forecasting, and motion planning (based on, for example, sensor data and the autonomous vehicle's trajectory). A trajectory represents a smooth path for traversing a corridor that does not have abrupt changes that would otherwise provide passenger discomfort. The trajectory may be determined using any now or hereafter known techniques for determining a automated vehicle trajectory without limitation; based on, for example, the location of the automated vehicle, one or more objects detected in the environment of the automated vehicle, map information, route information for traveling from the detected location to a destination, traffic rules associated with the corridor, or the like. For examples, the system may create/identify a corridor for the autonomous vehicle by taking the region of space swept out by advancing a vehicle polygon corresponding to the autonomous vehicle along a determined trajectory of the autonomous vehicle for a threshold time period.

It should be noted that for actors other than the autonomous vehicle (such as vehicle $302_1$ and vehicle $302_2$), the corridor is approximated by the pre-mapped lanes in an environment.

When such a yield scenario is identified in a conflicted space, vehicle $302_1$ performs operations to: determine which vehicle has right of way, generate a kinematic target, forecast one or more possible object trajectories for the detected object; and analyzes the forecasted trajectories to determine whether or not the object will yield to the autonomous vehicle. The system generates trajectories for the autonomous vehicle and controls its navigation based on the results of the analysis (as described below). In various implementations, an autonomous vehicle may determine the feasibility of an object yielding to the autonomous vehicle for traversing a conflicted space as well as the likelihood that the object will yield to the autonomous vehicle, and may then generate one or more paths to navigate through the conflicted space without colliding with the moving object.

Figure 4:
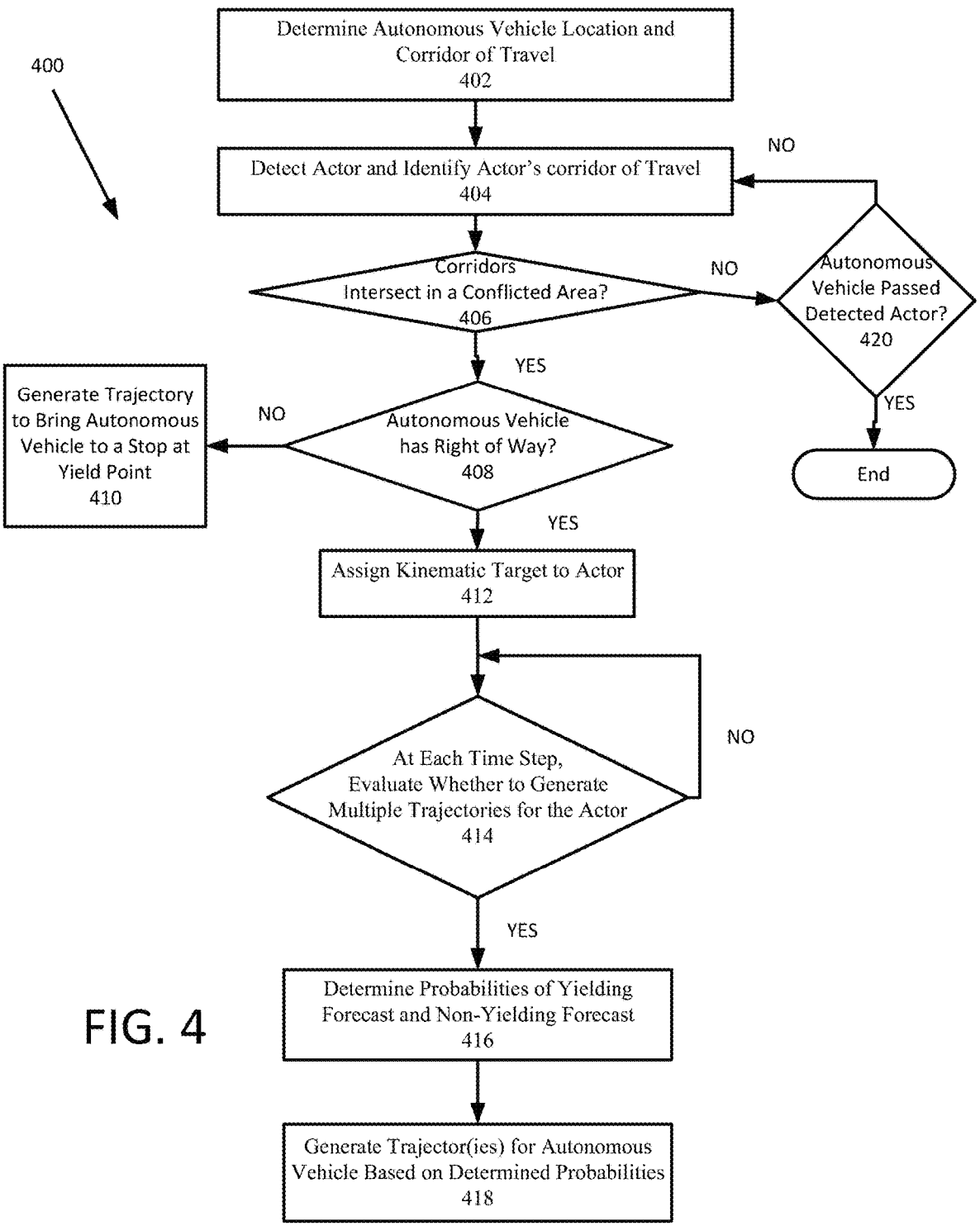
FIG. 4 illustrates a flow chart of an example process for predicting feasible paths through a conflicted area by analyzing predicted stated of an object.

FIG. 4 illustrates a flow chart of an example process for predicting feasible paths through a conflicted area by analyzing predicted stated of an object according to an implementation.

As illustrated in FIG. 4, at 402, a location of the automated vehicle and its expected corridor of travel determined and/or received. For example, the location of the automated vehicle may be determined based on sensor data output from a location sensor (e.g., location sensor 260 of FIG. 2) of the automated vehicle. This sensor data can include, but is not limited to, GPS data.

At 404, the system may detect an actor within the environment (i.e., within a certain distance) of the automated vehicle and identify a corridor in which the actor is traveling. This detection may be made based on sensor data output from the object detection sensors (e.g., object detection sensor 262 of FIG. 2) of the automated vehicle. The actor may be a moving object other than the autonomous vehicle that is in proximity to the intersection of interest such as, for example, another vehicle, a motorcycle, a bicycle, and/or the like.

The system may also determine information about the detected actor such as, without limitation, a speed of the actor, actor classification, a direction of travel of the actor, or the like. Actor classification may be performed to classify the detected actor into one of a plurality of classes and/or sub-classes. The classes can include, but are not limited to, a vehicle class and a pedestrian class. The vehicle class can have a plurality of vehicle sub-classes. The vehicle sub-classes can include, but are not limited to, a bicycle sub-class, a motorcycle sub-class, a skateboard sub-class, a roller blade sub-class, a scooter sub-class, a sedan sub-class, an SUV sub-class, and/or a truck sub-class. The actor classification is made based on sensor data output from, for example, an actor detection sensor such as a LiDAR system, radar and/or sonar system, and/or a camera of the vehicle. Any now or hereafter known actor classification techniques can be used such as, without limitation, point cloud labeling, machine learning algorithms for shape/pose estimation, or the like.

The system may use the determined information to identify the corridor in which the actor is traveling. The system may identify the corridor by, for example, using any now or known forecasting and prediction algorithms (as discussed above). For example, the system may create/identify a corridor by concatenating mapped lane segments during forecasting. Alternatively and/or additionally, the system may create/identify a corridor after forecasting the actor's trajectory by taking the region of space swept out by advancing a vehicle polygon corresponding to the actor along the forecasted trajectory.

Figure 5:
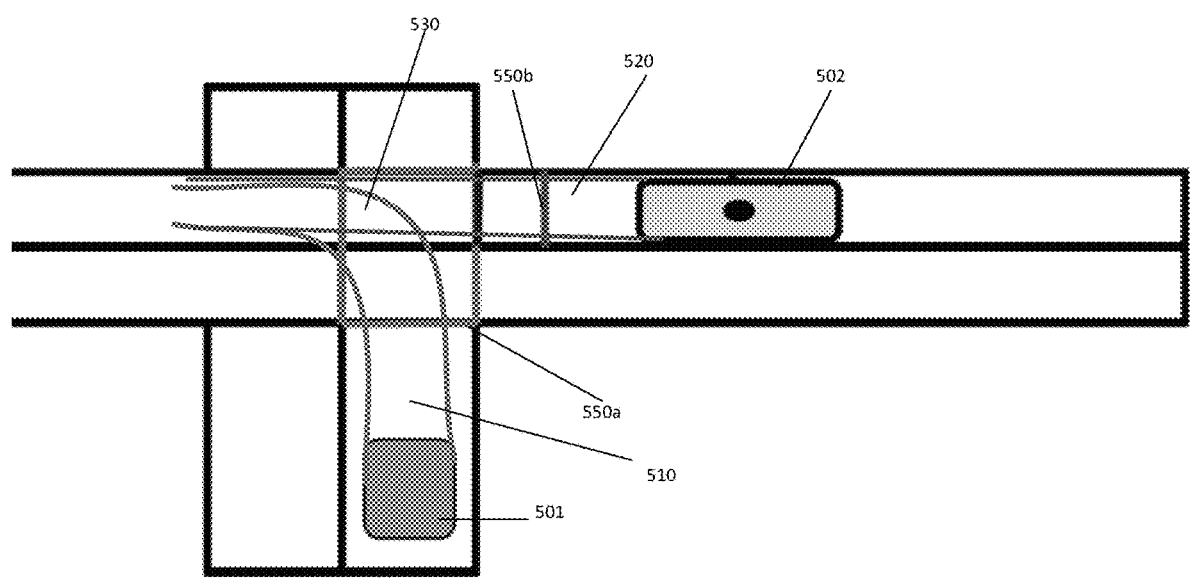
FIG. 5 illustrates example corridors of an autonomous vehicle and a detected object that intersect at a conflicted area.

At 406, the system may determine whether the autonomous vehicle's corridor of travel and the actor's corridor of travel intersect, and identify the area of intersection as the conflicted area. The corridors may be determined to intersect if both the autonomous vehicle and the actor will traverse the conflicted area while traveling in their respective corridors within a threshold time of each other, such that there is a high likelihood of collision between the actor and the autonomous vehicle. For example, FIG. 5 illustrates an actor 501 traveling in a corridor 510 and an autonomous vehicle 502 traveling in a corridor 520 that intersect at conflicted area 530.

Once a conflicted area is identified, the system may also identify a yield point corresponding to the autonomous vehicle and a yield point corresponding to the actor. A yield point(s) can represent the location, a certain distance from the conflicted area at which a vehicle will be required to make a decision whether to enter the conflicted area or stop at the yield point to yield to (i.e., give precedence to) another vehicle entering the conflicted area. Specifically, traversal of the conflicted area without a collision between the autonomous vehicle with the moving actor requires either the moving actor to yield to the autonomous vehicle by stopping at (or before) the corresponding yield point or the autonomous vehicle to yield to the moving actor by stopping at (or before) its corresponding yield point. The location chosen for the yield point can be based on the preliminary information identified for a conflicted area (e.g., an intersection). For example, an yield point can be a location a certain predefined distance from a STOP sign. In another example, if there is an obstacle that could at least partially obstruct the view of the conflicted area from a vehicle, the yield point can be positioned close to the conflicted area. Other factors impacting the selection of the location of the yield point can include the traffic density information, e.g., higher traffic density would lead to a yield point being close to the conflicted area, and the type and configuration of the intersection, e.g., a complicated intersection would lead to a yield point being close to the conflicted area. FIG. 5 shows a first yield point 550a in the actor's corridor at which the actor can stop to yield to the autonomous vehicle (i.e., autonomous vehicle has right of way) and a second yield point 550b in the autonomous vehicle's corridor before which the autonomous vehicle can yield to the moving actor (i.e., the moving actor has right of way) before entering the conflicted area 530. It should be noted that an yield point can also be the point of intersection between the corridors of the autonomous vehicle and the actor (and/or within a threshold distance of the point of intersection where stopping at the yield point will avoid collision between the autonomous vehicle and the actor).

If it is determined that the autonomous vehicle's corridor of travel and the actor's corridor of travel do not intersect (406: NO), the system may continue performing steps 404-406 until a determination is made (420) that the autonomous vehicle has passed the actor (i.e., the actor can no longer be detected within a certain distance of the autonomous vehicle). However, if the autonomous vehicle's corridor of travel and the actor's corridor of travel will intersect (406: YES), the system may then determine (408) whether the autonomous vehicle has right of way to traverse the conflicted area. Specifically, the system may determine whether the autonomous vehicle has precedence over the actor to traverse the conflicted area. The determination may be based on one or more traffic rules associated with the conflicted area (discussed above), actor classification (e.g., traffic rules may be different if the actor is a pedestrian, a bike, or a car, respectively), temporal state and trajectory of the actor and/or the autonomous vehicle (e.g., right of way may be determined based on whether the autonomous vehicle or the actor will reach an yield point/conflicted area first), or the like.

If the actor is determined to have right of way to traverse the conflicted area first (408: NO), the system may generate (410) a trajectory for the autonomous vehicle to bring the autonomous vehicle to a stop at or before an yield point in the autonomous vehicle's corridor (e.g., yield point 550b of FIG. 5), and to enter the conflicted region after the actor. Optionally, the system may also generate trajectories for the autonomous vehicle to steer in a different direction, speed up to clear the conflicted area before the actor (if safely feasible), or the like.

However, if the autonomous vehicle is determined to have right of way to traverse the conflicted area first (408: YES), the system may assign (412) a kinematic target to the actor that requires the actor to attain a speed of 0.0 (i.e., come to a stop) at or before a yield point in the actor's corridor (e.g., yield point 550a of FIG. 5).

At 414, the system may evaluate (for each time step) whether to forecast multiple trajectories for the actor. Specifically, the system may determine if it is possible that the actor may not achieve the kinematic target, and thus there is a need to forecast multiple possible trajectories for the actor to navigate the autonomous vehicle safely. For evaluating whether to forecast multiple trajectories for the actor, the system first identifies and/or generates a motion model for estimating the future behavior or motion (i.e., future trajectories) of the actor given its current and past states, dimensions, estimated goals (i.e., the kinematic target), or the like. Motion models may be generated based on various assumptions or from data collected by sensors of a plurality of vehicles overtime and/or based on assumptions defined by an administrator. A simple example of such a motion model may include behavior predicting that a vehicle traveling north at feet per second will be 2 feet north of its previous location after 1 second. In another example, a motion model may require that actors such as road signs are stationary relative to a moving vehicle. Similarly, the motion models may demonstrate differences between different types of actors, for example, a small vehicle may maneuver itself differently from a pedestrian or a bicycle. Any now or hereafter known actor tracking motion model may be used. Optionally, the actor classification of the detected actor may be used to identify the best motion model for that actor class. For example, by observing behaviors of passenger vehicles at the same or similar locations over time, a model of predictive motion of similar passenger vehicles may be generated.

The system may then use the motion model to generate a predicted motion of the actor (i.e., forecasted trajectory of the actor in the actor's corridor) over a prediction horizon. The prediction horizon may be divided into a series of discrete time-steps, and the forecasted state of the actor may be determined for each time-step by forecasting the actor forward in time and space along and/or conditioned upon a provided reference path (i.e., the predicted motion path). The forecasted state may include information about the actor at that time-step such as, without limitation, velocity, location, heading, orientation, acceleration, or the like. At each time-step, the system then evaluates the forecasted speed of the actor and the required braking power in the forecasted state to achieve the kinematic target using the following equation:

$$A_{T+1} = \frac{-1 \times (V_T)^2}{2 \times D_T}$$

Where:
A is required braking power for the next state or time-step to satisfy the kinematic target requirement (0.0 speed at or before the yield point);
V is the actor's forecasted speed at forecasted time T; and
D is the distance along the reference path to the kinematic target at forecasted time T.

The system may then determine whether it is feasible for the actor to achieve the required braking power. The system may make the determination based on the actor classification. For example, if the actor is classified as being a certain type of vehicle, the system may determine the maximum allowed braking power for that type of vehicle by accessing the vehicle specifications (e.g., in a data store), and compare the required braking power with the maximum allowed braking power. As long as the required braking power remains less than or equal to the maximum allowed braking power, the system may determine that the actor will achieve the kinematic target and come to a stop before the yield point (i.e., the actor is assumed to have maximum braking capacity), and there is no need to generate or forecast multiple trajectories for the actor. It should be noted that the maximum braking power physically attainable for a vehicle may be different from a maximum braking power allowed for passenger comfort, for a certain surface types, for different weather conditions, etc.; and the system may take into account such factors while determining whether it is feasible for the actor to achieve the required braking power.

Optionally, the system may also determine whether the required braking power is less than a threshold value instead of the maximum braking power allowed for the actor. The threshold value may be determined based on, for example, the nominal braking power of the actor determined using observed data, actor classification and associated properties, environmental conditions (e.g., wet surfaces, icy, etc.), actor's forecasted trajectory, or the like. The threshold values may be indicative of a braking power that is less than the maximum allowed braking power but will cause discomfort to the passenger, skidding, jerks or jolts, breakdown of the actor, or the like.

For each time-step, if it is determined that it does not need to generate or forecast multiple trajectories for the actor because it can achieve the kinematic target at a first time step (414: NO), the system may continue performing step 414 for each successive time step. Specifically, the system generates one forecasted trajectory for the actor and continues evaluating it at each successive time step until it determines that multiple trajectories need to be generated/forecasted. Therefore, at every successive time-step, the system generates a new forecasted state of the actor and re-evaluates the newly generated forecasted state to determine a required braking power and whether it is feasible for the actor to achieve the required braking power and/or whether the system needs to generate multiple forecasted trajectories.

If the system needs to forecast multiple trajectories for the actor (because, for example, it is possible that the actor may not achieve the kinematic target) (414: YES) the system may determine respective probabilities (416) of an yielding forecast (i.e., a forecast that the actor will respect the autonomous vehicle's right of way and come to a stop at or before the yield point) and a non-yielding forecast (i.e., a forecast that the actor will not respect the autonomous vehicle's right of way and will not come to a stop at or before the yield point). The respective probabilities correspond to pairwise likelihood determination between the yielding forecast and the non-yielding forecast.

Figure 6:
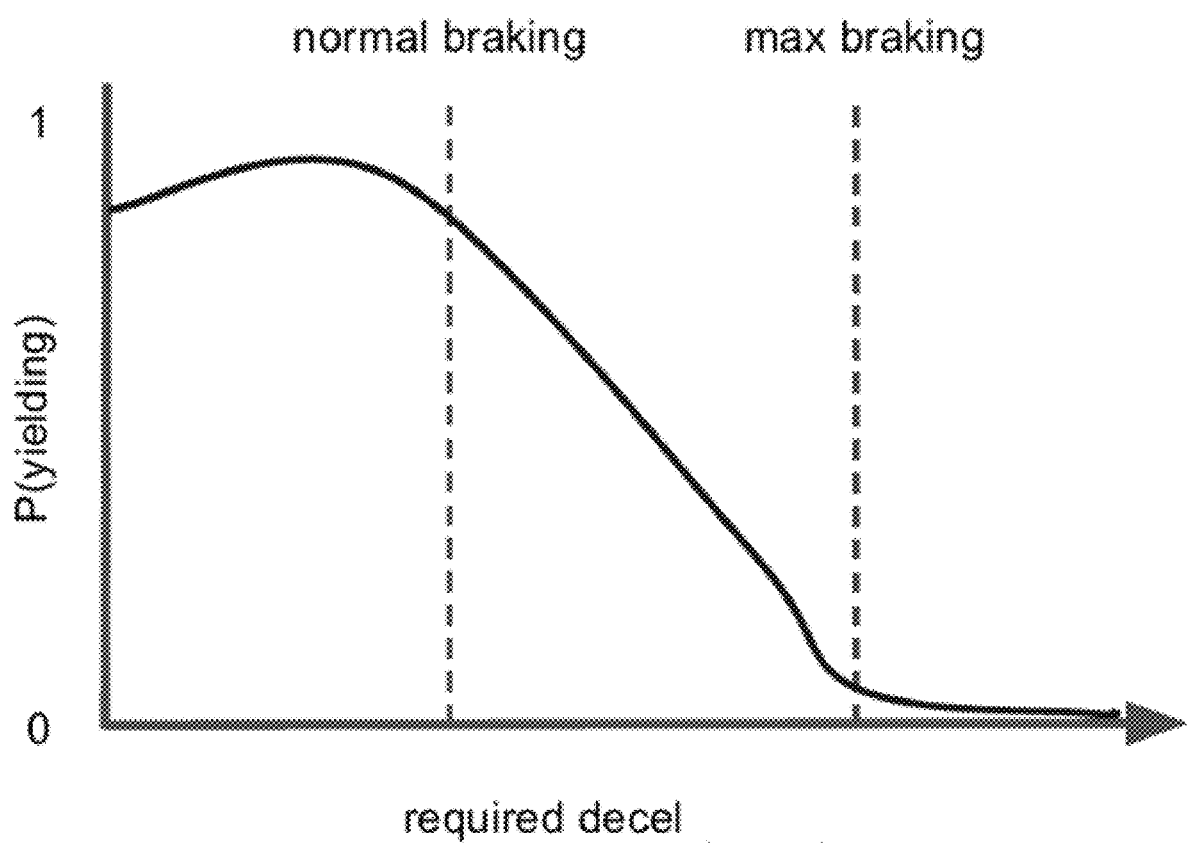
FIG. 6 illustrates an example plot of probability of braking versus required braking power for an object.

The system may use a classifier that uses the required braking power determined in step 412 to determine the probabilities. In some implementations, the system can be configured to use previously captured training data (including previous actor behaviors with respect to yielding to other objects in different situations and braking powers), and information such as information about the conflicted area, actor classification, traffic density information, map information, etc., to determine a classifier for determining probabilities of a yielding forecast and a non-yielding forecast. For example, as shown in FIG. 6, a classifier may be trained to generate a plot of probability of yielding versus required braking power using training data. Examples of such classifiers may include, without limitation, an Ensemble classifier such as a Random Forest classifier, Decision Tree classifier, Neural Network classifier Conditional Random Field classifier, Reinforcement Learning classifier, Bayes classifier, or the like. Optionally, the system may propose a parametric expression to generate the probabilities.

As shown in FIG. 6, for any actor, the probability of yielding remains the same if the required braking power is below the threshold value. However, as the required braking power/deceleration increases over a threshold value, the probability of yielding continuously decreases. It is assumed that the probability of yielding is the inverse of the probability of not yielding such that:

$P$ (Yielding)=1−$P$ (Not Yielding)

At 418, the system generates one or more trajectories for the autonomous vehicle based on the determined probabilities of the yielding forecast and the non-yielding forecast. Specifically, the probabilities may be used by the on-board computing device to adjust one or more driving operations of an autonomous vehicle. For example, the system may cause an autonomous vehicle to accelerate, decelerate, brake, change direction, adjust its trajectory, and/or perform one or more collision avoidance operations based on the probabilistic behavior of the actor through an intersection. For example, a trajectory may include requiring the autonomous vehicle to brake aggressively if the probability of the non-yielding forecast is over a threshold value and it is likely that the actor will, for example, run a stop sign/red light; in order to avoid collision.

In an example scenario, if the system determines that the likelihood that the actor will not yield to the autonomous vehicle before entering the conflicted space is very high compared to the likelihood that the actor will yield, it may generate one or more trajectories for the autonomous vehicle that avoids collision with the actor in the conflicted space. For example, the generated trajectory may include bringing the autonomous vehicle to a stop before reaching the conflicted space, a path that avoids traversal of the conflicted space (e.g., by steering), a path that causes the autonomous vehicle to traverse the conflicted space before the actor reaches the conflicted space, or the like. Specifically, this prediction information may be used by the on-board computing device to adjust one or more driving operations of an autonomous vehicle. For example, the system may cause an autonomous vehicle to accelerate, decelerate, brake, change direction, adjust its trajectory, and/or perform one or more collision avoidance operations based on the predicted behavior of the actor through an intersection.

As an example, at step 418, an on-board computing device (shown in FIG. 2) may receive at least a portion of the prediction data, and may analyze it to execute or more vehicle control instructions. For instance, in response to analyzing the probabilities and/or feasibility of achieving the kinematic target, an on-board computing device may execute one or more control instructions that cause the autonomous vehicle to decelerate or brake at an intersection in order to yield to the actor, or traverse the conflicted area before the actor. For example, an on-board computing device may cause one or more brakes of the autonomous vehicle to be applied. Additional and/or alternate driving operations may be performed within the scope of this disclosure.

The process 400 is divided into distinct phases that may be performed independently of each other and at different frequencies (after determining that the autonomous vehicle has right of way). The first phase may include determination of a kinematic target for an actor in the environment of the autonomous vehicle. The system may generate a kinematic target every time the autonomous vehicle is determined right of way precedence over an actor in the vicinity of the autonomous vehicle for traversing a conflicted area. Furthermore, while the yield point remains the same in space, the kinematic target may be regenerated during each prediction cycle of the process (i.e., several times per second).

The second phase may include monitoring the actor and evaluating the need for generating multiple trajectories for the actor. The second phase may be executed for each time-step in a prediction horizon or cycle (about 10-15 times per second) as the actor travels in its corridor of travel towards the conflicted area. While the current disclosure describes executing the second phase 10-15 times per second, the disclosure is not so limiting and it may be executed at less or more frequency such as, without limitation, 11-14 times, 8-12 times per second, once every 10-12 times per second, or the like, depending on real-time perception information, user instructions, or the like.

Once the system determines that there is a possibility that the actor may not come to a stop at or before the yield point, the third phase is executed that includes determining the likelihood of a yielding forecast compared to a non-yielding forecast, for the detected actor. In the third phase, the system may generate one or more trajectories for the autonomous vehicle based on the respective probabilities of a yielding forecast and a non-yielding forecast. The third phase may be executed at a frequency of about 8-15 Hz, about 9-14 Hz, about 10-12 Hz, about 10 Hz, etc., depending on real-time perception information, user instructions, or the like.

Figure 7:
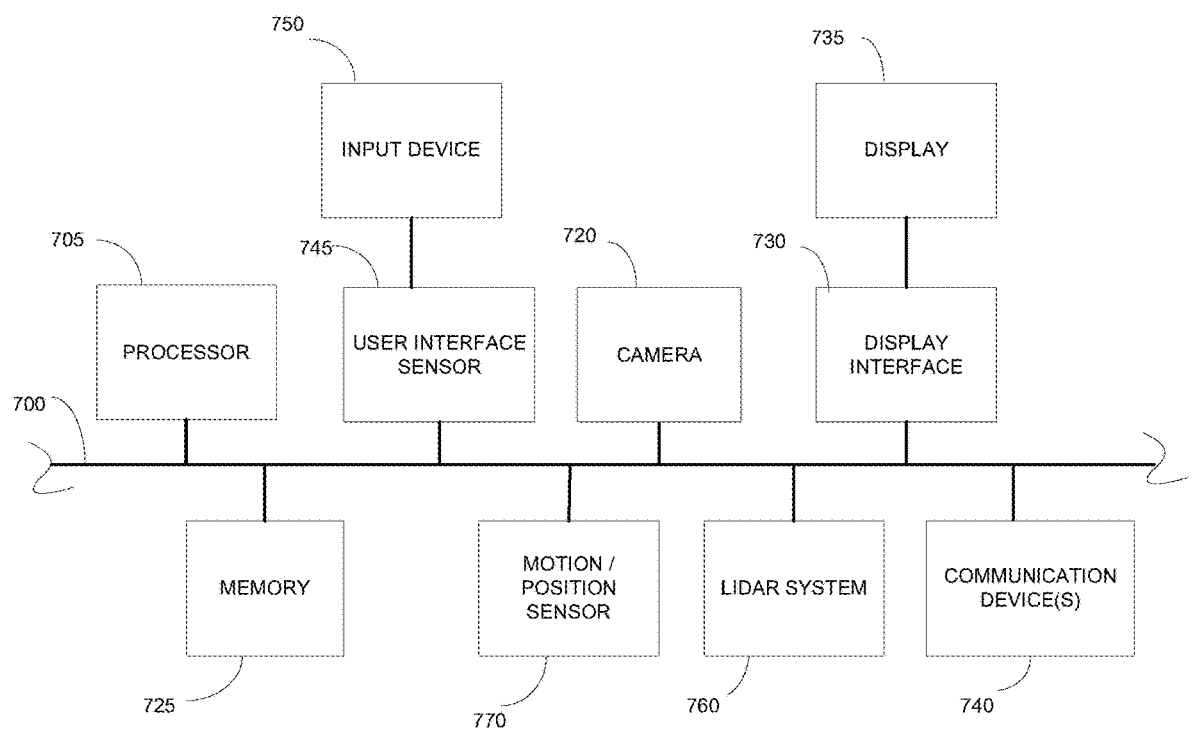
FIG. 7 is a block diagram that illustrates various elements of a possible electronic system, subsystem, controller and/or other component of an AV, and/or external electronic device.

FIG. 7 depicts an example of internal hardware that may be included in any of the electronic components of the system, such as internal processing systems of the AV, external monitoring and reporting systems, or remote servers. An electrical bus 700 serves as an information highway interconnecting the other illustrated components of the hardware. Processor 705 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 725. A memory device may include a single device or a collection of devices across which data and/or instructions are stored. Various embodiments of the invention may include a computer-readable medium containing programming instructions that are configured to cause one or more processors, and/or devices to perform the functions described in the context of the previous figures.

An optional display interface 730 may permit information from the bus 700 to be displayed on a display device 735 in visual, graphic or alphanumeric format, such on an in-dashboard display system of the vehicle. An audio interface and audio output (such as a speaker) also may be provided. Communication with external devices may occur using various communication devices 740 such as a wireless antenna, a radio frequency identification (RFID) tag and/or short-range or near-field communication transceiver, each of which may optionally communicatively connect with other components of the device via one or more communication system. The communication device(s) 740 may be configured to be communicatively connected to a communications network, such as the Internet, a local area network or a cellular telephone data network.

The hardware may also include a user interface sensor 745 that allows for receipt of data from input devices 750 such as a keyboard or keypad, a joystick, a touchscreen, a touch pad, a remote control, a pointing device and/or microphone. Digital image frames also may be received from a camera 720 that can capture video and/or still images. The system also may receive data from a motion and/or position sensor 770 such as an accelerometer, gyroscope or inertial measurement unit. The system also may receive data from a LiDAR system 760 such as that described earlier in this document.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes:

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions. Alternatively, it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other advanced driver assistance systems.

In this document, the terms "street," "lane" and "intersection" are illustrated by way of example with vehicles traveling on one or more roads. However, the embodiments are intended to include lanes and intersections in other locations, such as parking areas. In addition, for autonomous vehicles that are designed to be used indoors (such as automated picking devices in warehouses), a street may be a corridor of the warehouse and a lane may be a portion of the corridor. If the autonomous vehicle is a drone or other aircraft, the term "street" may represent an airway and a lane may be a portion of the airway. If the autonomous vehicle is a watercraft, then the term "street" may represent a waterway and a lane may be a portion of the waterway.

The terms "intersection" means a location where two or more streets meet or cross each other.

An "electronic device" or a "computing device" refers to a device that includes a processor and memory. Each device may have its own processor and/or memory, or the processor and/or memory may be conflicted with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

The term "classifier" means an automated process by which an artificial intelligence system may assign a label or category to one or more data points. A classifier includes an algorithm that is trained via an automated process such as machine learning. A classifier typically starts with a set of labeled or unlabeled training data and applies one or more algorithms to detect one or more features and/or patterns within data that correspond to various labels or classes. The algorithms may include, without limitation, those as simple as decision trees, as complex as Naïve Bayes classification, and/or intermediate algorithms such as k-nearest neighbor.

Classifiers may include artificial neural networks (ANNs), support vector machine classifiers, and/or any of a host of different types of classifiers. Once trained, the classifier may then classify new data points using the knowledge base that it learned during training. The process of training a classifier can evolve over time, as classifiers may be periodically trained on updated data, and they may learn from being provided information about data that they may have misclassified. A classifier will be implemented by a processor executing programming instructions, and it may operate on large data sets such as image data, LiDAR system data, and/or other data.

A "motion model" refers to a set of algorithmic routines and parameters that can predict an output(s) of a real-world process (e.g., prediction of an object trajectory, a diagnosis or treatment of a patient, a suitable recommendation based on a user search query, etc.) based on a set of input features, without being explicitly programmed. A structure of the software routines (e.g., number of subroutines and relation between them) and/or the values of the parameters can be determined in a training process, which can use actual results of the real-world process that is being modeled. Such systems or models are understood to be necessarily rooted in computer technology, and in fact, cannot be implemented or even exist in the absence of computing technology. While machine learning systems utilize various types of statistical analyses, machine learning systems are distinguished from statistical analyses by virtue of the ability to learn without explicit programming and being rooted in computer technology.

The term "object," when referring to an object that is detected by a vehicle perception system or simulated by a simulation system, is intended to encompass both stationary objects and moving (or potentially moving) actors, except where specifically stated otherwise by terms use of the term "actor" or "stationary object."

In this document, when relative terms of order such as "first" and "second" are used to modify a noun, such use is simply intended to distinguish one item from another, and is not intended to require a sequential order unless specifically stated.

In addition, terms of relative position such as "vertical" and "horizontal", or "front" and "rear", when used, are intended to be relative to each other and need not be absolute, and only refer to one possible position of the device associated with those terms depending on the device's orientation. When this document uses the terms "front," "rear," and "sides" to refer to an area of a vehicle, they refer to areas of vehicle with respect to the vehicle's default area of travel. For example, a "front" of an automobile is an area that is closer to the vehicle's headlamps than it is to the vehicle's tail lights, while the "rear" of an automobile is an area that is closer to the vehicle's tail lights than it is to the vehicle's headlamps. In addition, the terms "front" and "rear" are not necessarily limited to forward-facing or rear-facing areas but also include side areas that are closer to the front than the rear, or vice versa, respectively. "Sides" of a vehicle are intended to refer to side-facing sections that are between the foremost and rearmost portions of the vehicle.

What is claimed is:

1. A method of predicting actions of an actor before entering a conflicted area, the method comprising:
    detecting, using sensor data received from one or more sensors of an autonomous vehicle, presence of an actor in an environment of the autonomous vehicle while the autonomous vehicle and the actor are approaching the conflicted area;
    determining whether the autonomous vehicle has precedence over the actor for traversing the conflicted area;
    in response to determining that the autonomous vehicle has precedence over the actor for traversing the conflicted area, assigning a kinematic target to the actor that requires the actor to come to a stop at a yield point before entering the conflicted area;
    at one of a plurality of time steps, in response to determining that the actor cannot achieve the kinematic target, generating, using a motion model, a plurality of forecasted trajectories for the actor; and
    controlling, using the plurality of forecasted trajectories, movement of the autonomous vehicle to traverse the conflicted area.

2. The method of claim 1, further comprising determining whether the actor can achieve the kinematic target by:
    forecasting, using the motion model, a first state of the actor as it travels towards the yield point;
    determining, using the first state, a required braking power to bring the actor to a stop before the yield point when applied at a second state; and
    determining that the actor can achieve the kinematic target if the actor can accomplish the required braking power.

3. The method of claim 2, wherein:
    the motion model is used to predict a motion of the actor over a prediction horizon as it travels towards the yield point, the prediction horizon comprising the plurality of time-steps,
    the first state is the state of the actor at a first one of the plurality of time-steps, and
    the second state is the state of the actor at a second one of the plurality of time-steps that occurs sequentially after the first time-step.

4. The method of claim 2, further comprising, in response to determining that the actor can achieve the kinematic target, continue determining whether the actor can achieve the kinematic target over each of the plurality of time steps included in the prediction horizon.

5. The method of claim 2, wherein determining whether the actor can accomplish the required braking power comprises comparing the required braking power to a maximum allowed braking power corresponding to the actor.

6. The method of claim 5, further comprising identifying the maximum allowed braking power corresponding to the actor by:
    classifying the actor into one of a plurality of actor classes; and
    using a maximum allowed braking power associated with that one of the plurality of actor classes as the maximum allowed braking power corresponding to the actor.

7. The method of claim 2, further comprising:
    determining that the actor cannot achieve the kinematic target if the actor cannot accomplish the required braking power; and
    controlling movement of the autonomous vehicle to yield to the actor before traversing the conflicted area.

8. The method of claim 2, further comprising, in response to determining that the autonomous vehicle has precedence over the actor for traversing the conflicted area, controlling movement of the autonomous vehicle to stop at a second yield point in an expected corridor of travel for the autonomous vehicle before traversing the conflicted area.

9. The method of claim 1, wherein using the plurality of forecasted trajectories for controlling movement of the autonomous vehicle to traverse the conflicted area by generating the plurality of forecasted trajectories for the actor comprises:
forecasting, using the motion model, a first state of the actor as it travels towards the yield point;
using the first state to determine a required braking power to bring the actor to a stop before the yield point when applied at a second state; and
determining, based on the required braking power:
a first probability associated with a first set of forecasted trajectories that comprise the actor coming to a stop at the yield point, and
a second probability associated with a second set of forecasted trajectories that comprise the actor not coming to a stop at the yield point.

10. The method of claim 9, wherein determining, based on the required braking power, the first probability and the second probability comprises using a classifier trained to determine the first probability and the second probability.

11. The method of claim 9, further comprising controlling movement of the autonomous vehicle to traverse the conflicted area based on the first probability and the second probability.

12. The method of claim 9, further comprising:
determining whether the actor can accomplish the required braking power by comparing the required braking power to a maximum allowed braking power corresponding to the actor; and
in response to determining that the actor cannot accomplish the required braking power, controlling movement of the autonomous vehicle to yield to the actor before traversing the conflicted area.

13. The method of claim 1, further comprising:
identifying an expected corridor of travel for the autonomous vehicle;
identifying an expected corridor of travel for the actor; and
determining, whether the autonomous vehicle has precedence over the actor for traversing the conflicted area only if the expected corridor of travel for the autonomous vehicle and the expected corridor of travel for the actor intersect in the conflicted area.

14. The method of claim 13, further comprising identifying the yield point in the expected corridor of travel for the actor.

15. A system for predicting actions of an actor before entering a conflicted area, the system comprising:
an autonomous vehicle comprising one or more sensors;
a processor; and
a non-transitory computer-readable medium comprising one or more instructions that when executed by the processor, cause the processor to:
detect, based on data collected by the one or more sensors, presence of an actor in an environment of the autonomous vehicle while the autonomous vehicle and the actor are approaching the conflicted area,
determine whether the autonomous vehicle has precedence over the actor for traversing the conflicted area,
in response to determining that the autonomous vehicle has precedence over the actor for traversing the conflicted area, assign a kinematic target to the actor that requires the actor to come to a stop at a yield point before entering the conflicted area,
at one of a plurality of time steps, in response to determining that the actor cannot achieve the kinematic target, generate a plurality of forecasted trajectories for the actor, and
control, using the plurality of forecasted trajectories, movement of the autonomous vehicle to traverse the conflicted area.

16. The system of claim 15, further comprising programming to cause the processor to determine whether the actor can achieve the kinematic target by:
forecast, using a motion model, a first state of the actor as it travels towards the yield point;
determine, using the first state, a required braking power to bring the actor to a stop before the yield point when applied at a second state; and
determine that the actor can achieve the kinematic target if the actor can accomplish the required braking power.

17. The system of claim 16, wherein:
the motion model is used to predict a motion of the actor over a prediction horizon as it travels towards the yield point, the prediction horizon comprising the plurality of time-steps,
the first state is the state of the actor at a first one of the plurality of time-steps, and
the second state is the state of the actor at a second one of the plurality of time-steps that occurs sequentially after the first time-step.

18. The system of claim 16, further comprising, programming instructions that when executed by the processor, cause the processor to, in response to determining that the, actor can achieve kinematic target, continue determining whether the actor can achieve the kinematic target over each of the plurality of time steps included in the prediction horizon.

19. The system of claim 16, wherein the programming instructions that when executed by the processor, cause the processor to determine whether the actor can accomplish the required braking power comprise programming instructions to cause the processor to compare the required braking power to a maximum allowed braking power corresponding to the actor.

20. The system of claim 19, further comprising programming instructions that when executed by the processor, cause the processor to identify the maximum allowed braking power corresponding to the actor by:
classifying the actor into one of a plurality of actor classes; and
using a maximum allowed braking power associated with that one of the plurality of actor classes as the maximum allowed braking power corresponding to the actor.

21. The system of claim 16, further comprising, programming instructions that when executed by the processor, cause the processor to:
determine that the actor cannot achieve the kinematic target if the actor cannot accomplish the required braking power; and
control movement of the autonomous vehicle to yield to the actor before traversing the conflicted area.

22. The system of claim 15, wherein the programming instructions that when executed by the processor, cause the processor to control movement of the autonomous vehicle to traverse the conflicted area by generating the plurality of forecasted trajectories for the actor comprise programming instructions to cause the processor to:
forecast, using a motion model, a first state of the actor as it travels towards the yield point;

use the first state to determine a required braking power to bring the actor to a stop before the yield point when applied at a second state; and determine, based on the required braking power:
- a first probability associated with a first set of forecasts that comprise the actor coming to a stop at the yield point, and
- a second probability associated with a second set of forecasts that comprise the actor coming to a stop at the yield point.

23. The system of claim 22, wherein the programming instructions that when executed by the processor, cause the processor to determine, based on the required braking power, the first probability and the second probability comprise programming instructions to use a classifier trained to determine the first probability and the second probability.

24. The system of claim 22, further comprising programming instructions that when executed by the processor, cause the processor to control movement of the autonomous vehicle to traverse the conflicted area based on the first probability and the second probability.

25. The system of claim 22, further comprising programming instructions that when executed by the processor, cause the processor to:
- determine whether the actor can accomplish the required braking power by comparing the required braking power to a maximum allowed braking power corresponding to the actor; and
- in response to determining that the actor cannot accomplish the required braking power, control movement of the autonomous vehicle to yield to the actor before traversing the conflicted area.

26. The system of claim 15, further comprising programming instructions that when executed by the processor, cause the processor to:
- identify an expected corridor of travel for the autonomous vehicle;
- identify an expected corridor of travel for the actor; and
- determine, whether the autonomous vehicle has precedence over the actor for traversing the conflicted area only if the expected corridor of travel for the autonomous vehicle and the expected corridor of travel for the actor intersect in the conflicted area.

27. The system of claim 26, further comprising programming instructions that when executed by the processor, cause the processor to identify the yield point in the expected corridor of travel for the actor.

28. The system of claim 26, further comprising programming instructions that when executed by the processor, cause the processor to, in response to determining that the autonomous vehicle has precedence over the actor for traversing the conflicted area, control movement of the autonomous vehicle to stop at a second yield point in the expected corridor of travel for the autonomous vehicle before traversing the conflicted area.

* * * * *